United States Patent [19]

Battenfield

[11] Patent Number: 5,540,404
[45] Date of Patent: Jul. 30, 1996

[54] DOUBLE-DECKED AIRCRAFT WITH PLUG DOOR

[75] Inventor: Alva L. Battenfield, Huntington Beach, Calif.

[73] Assignee: McDonnell Douglas Corporation, Long Beach, Calif.

[21] Appl. No.: 224,684

[22] Filed: Apr. 8, 1994

[51] Int. Cl.$^6$ .................................................. B64C 1/14
[52] U.S. Cl. ............................... 244/129.5; 244/129.4; 244/137.2
[58] Field of Search ................... 244/129.1, 129.4, 244/129.5, 905, 118.6, 137.2

[56] References Cited

U.S. PATENT DOCUMENTS

| | | |
|---|---|---|
| 2,323,161 | 6/1943 | Stouffer . |
| 2,752,114 | 6/1956 | Calvy . |
| 3,376,668 | 4/1968 | Smedstad . |
| 3,421,260 | 1/1969 | Dickinson . |
| 3,424,411 | 1/1969 | Blunschi, Sr. et al. . |
| 3,585,757 | 6/1971 | Ritchie et al. . |
| 3,591,111 | 7/1971 | Spence . |
| 3,771,749 | 11/1973 | Smialowicz ..................... 244/137.2 |
| 4,066,227 | 1/1978 | Buchsel ............................ 244/118.6 |
| 4,106,729 | 8/1978 | Bergman et al. . |
| 4,125,235 | 11/1978 | Fitzgerald et al. ............... 244/129.5 |
| 4,375,876 | 3/1983 | Stewart . |
| 4,470,566 | 9/1984 | Fitzgerald . |
| 4,479,622 | 10/1984 | Howse . |
| 4,489,975 | 12/1984 | Fredin . |
| 4,601,446 | 7/1986 | Opeahl . |
| 5,064,147 | 11/1991 | Noble et al. . |

FOREIGN PATENT DOCUMENTS 1218290  6/1966  Germany .......................... 244/129.5

Primary Examiner—Andres Kashnikow
Assistant Examiner—Virna Lissi Mojica
Attorney, Agent, or Firm—Elliott N. Kramsky

[57] ABSTRACT

A plug-type door is provided for an aircraft of the double-decked type. A compartment is formed between the upper deck of the aircraft and a header. An aperture is provided adjacent an edge of the header for permitting transit of the door therethrough. A set of guide tracks is arranged at the edge of the door jamb and a pulley system is provided for guiding the door between closure and storage within the compartment.

15 Claims, 5 Drawing Sheets

FIG. 1
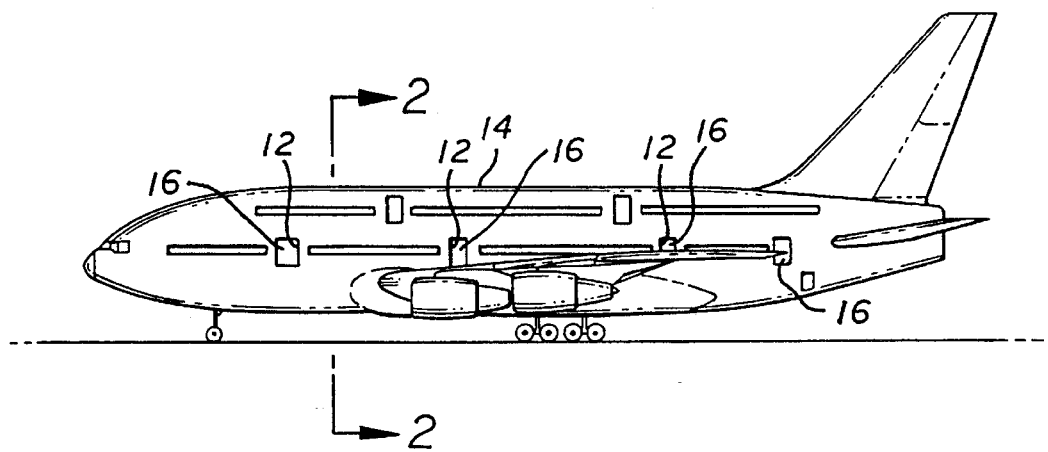
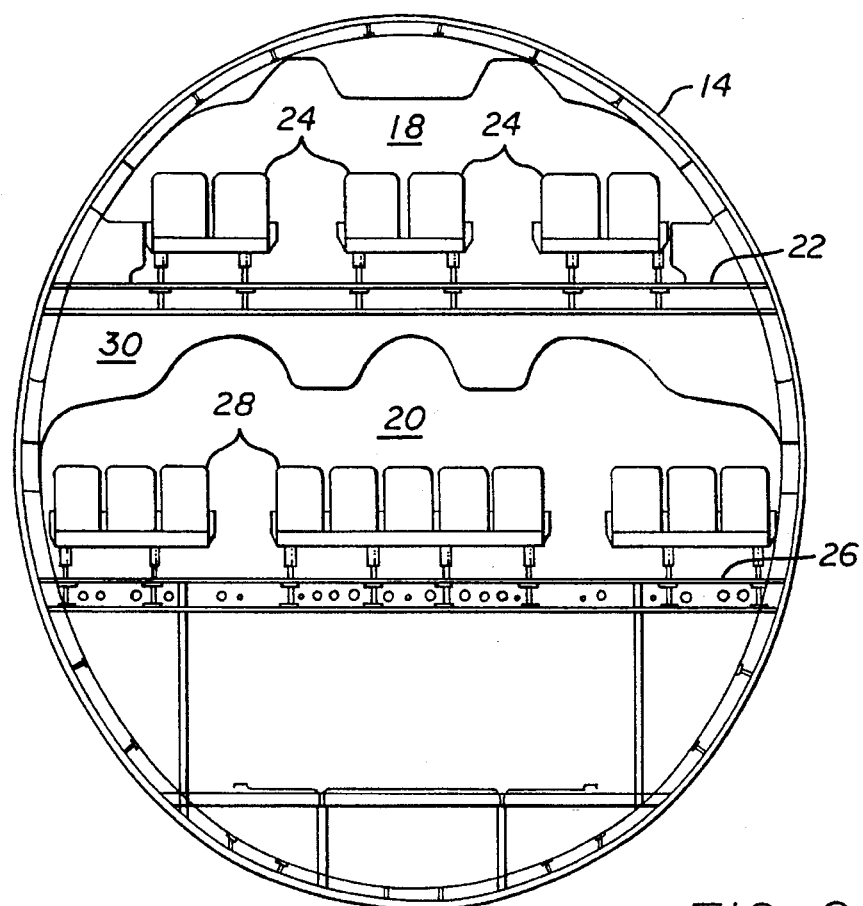
FIG. 2

DOUBLE-DECKED AIRCRAFT WITH PLUG DOOR

BACKGROUND

1. Field of the Invention

The present invention relates to aircraft doors and associated mechanisms. More particularly, this invention pertains to a plug door system adapted for use with double decked fuselage configurations.

2. Description of the Prior Art

Plug-type doors are inwardly-opening devices designed to fit into ingress and egress openings of an aircraft's fuselage. Cabin pressure seals the door shut against a door jamb. The outer surface or skin of the door is designed to form a substantially smooth, continuous and uninterrupted exterior surface with the fuselage. When open, such doors are arranged to work inwardly and upwardly into the aircraft fuselage and to slide along tracks mounted on the interior thereof. Such doors are electrically operated in some cases and manually operated in others.

A representative plug door mechanism of the above-referenced type is disclosed in U.S. Pat. No. 3,585,757 entitled "Overhead Opening Plug Door", property of the assignee herein. That patent discloses a system suitable for adaptation to an aircraft, such as the well-known DC-10, whose fuselage encloses a cabin that includes an arrangement of crew and passenger seats attached to a common planar floor. The door includes mechanisms for retracting it directly above the door jamb and into the wall of the fuselage. Tracks are mounted within the fuselage for receiving elements associated with the door. Power-actuated cables move the door along the tracks. The door is roller-mounted to the tracks which possess a curvature. The curvature essentially traces that of the fuselage. Push-pull rods and cam linkages are provided for operating the door between its open and closed positions.

While mechanisms of the above described type provide an adequate means for operating and storing the door in a reliable and unobstructive manner, they are not suitable for aircraft of the so-called double-decked type that include a second, upper deck or floor that divides the interior of the fuselage into two vertically stacked levels. This increases passenger capacity and comfort substantially by providing efficient utilization of overhead space. FIG. 1 is a side elevation view of a representative aircraft of the double-decked type while FIG. 2 is a cross-sectional view of that aircraft taken at line 2—2 of FIG. 1. A plurality of lower level door jambs 12 are provided for ingress to and egress from the fuselage 14. Each Door jamb 12 receives a plug door 16. As can be seen in FIG. 2, the interior of the fuselage 14 is divided into an upper cabin 18 and a main cabin 20 by an upper floor 22. The floor 22 may comprise a planar array of J-beams and associated structures. The upper floor 22 supports a set of passenger seats 24 to increase passenger capacity beyond that otherwise attainable. A lower floor 26 supports a set of passenger seats 28 within the main cabin 20.

While offering an efficient use of fuselage height, structural considerations reduce the availability of usable fuselage storage space above the door jambs 12 in a double-decked aircraft.

SUMMARY OF THE PREFERRED EMBODIMENT

The foregoing and other shortcomings of the prior art are addressed by the present invention which provides an improvement is an aircraft of the type that includes an upper floor for defining an upper cabin and a main cabin. Such improvement includes a plug door. A door jamb is located in a side of the fuselage of the aircraft adjacent the main cabin. The door jamb is adapted to receive the plug door. A header panel is arranged beneath the upper floor and forms a storage compartment therewith. Means, associated with the fuselage, are provided for guiding the door between the door jamb and the compartment. Means are associated with the door for engaging the last-named means.

The preceding and other features and advantages of the present invention will be further appreciated from the detailed description that follows. Such description is accompanied by a set of drawing figures. Numerals of the drawing figures, corresponding to those of the written text, point to the various features of the invention. Like numerals refer to like features throughout both the written description and the drawing figures.

BRIEF DESCRIPTION OF THE DRAWINGS

FIG. 1 is a side elevation view of an aircraft of the double-decked type;

FIG. 2 is a cross-sectional view of the double-decked aircraft taken at line 2—2 of FIG. 1;

DETAILED DESCRIPTION

Figure 3:
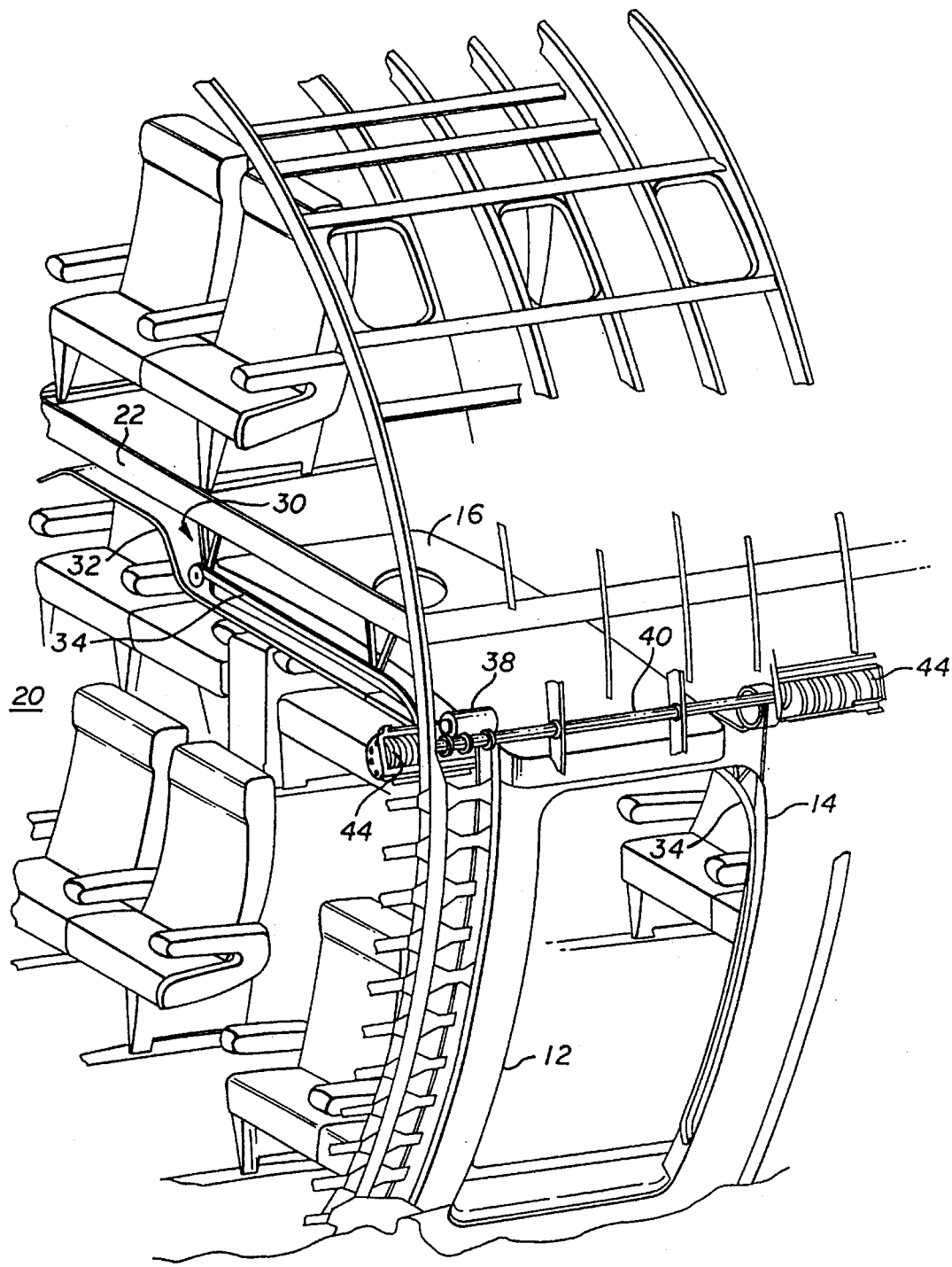
FIG. 3 is a perspective view of a double-decked aircraft with portions broken away to show a plug door mounted for storage in accordance with the present invention.

Turning to the drawings, FIG. 3 is a perspective view of a double-decked aircraft with portions broken away to show a plug door 16 mounted for storage in accordance with the invention. As can be seen, the door 16 is retained within an upper deck compartment 30 in an attitude that is substantially orthogonal to the door jamb 12. The upper deck compartment 30 is formed between the upper floor 22 and a header panel 32 of appropriate material that includes surface areas substantially parallel to the lower surface of the upper floor 22. An aperture (not shown in FIG. 3) at the edge of the header panel 32 in the region above the door plug jamb 12 permits the door 16 to travel between closure within the door jamb 12 and to be stored as shown.

Guide tracks 34 are provided for guiding the door 16 between the door jamb 12 and the upper deck compartment 30. The tracks 34 extend upwardly on both sides of the door jamb 12 and continue into the compartment 30. The guide tracks 34 are adapted to receive rollers 36 attached to the door 16 that assist in transporting the door 16 between the door jamb 12 and the upper deck compartment 30. An electric motors 38 is mounted to rotate a shaft 40. The motor 38 serves as the power source for moving a cable 42 that urges the door 16 along the guide tracks 34. Counterbalance springs 44, driven by the motor 38, oppose the weight of the door 16 to facilitate manual opening.

Figure 4:
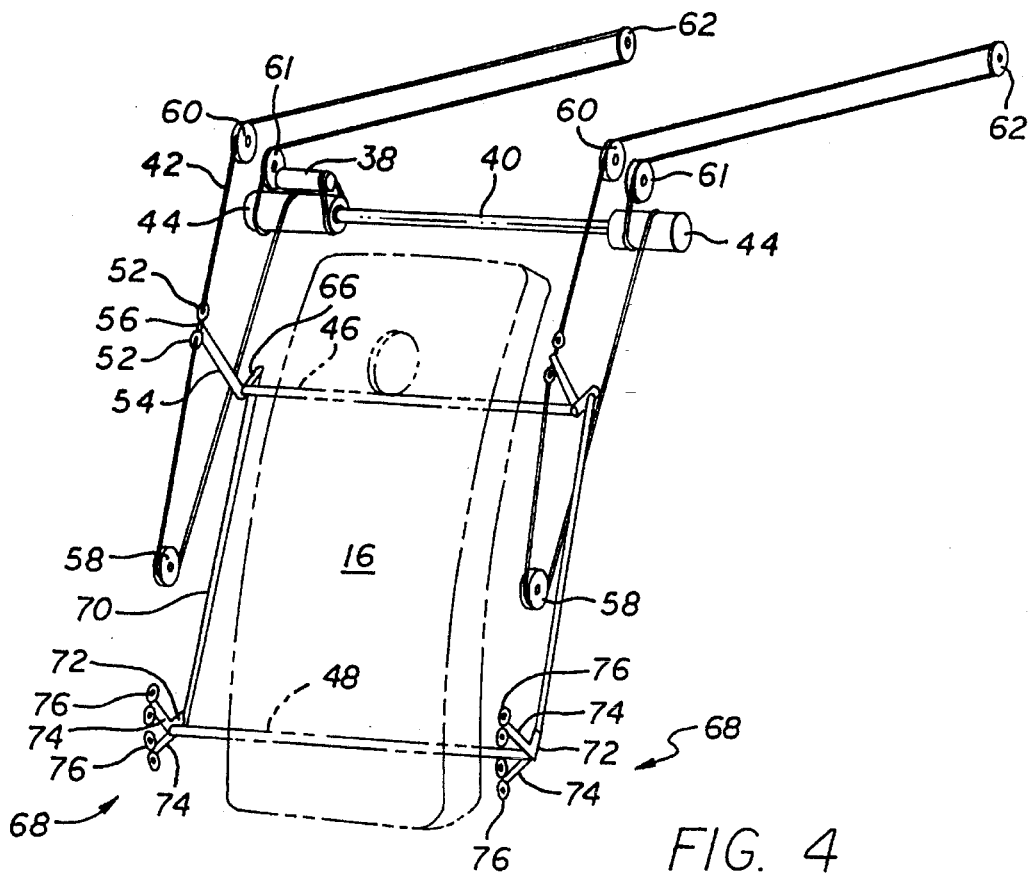
FIG. 4 is perspective schematic view of the cables and linkages for guiding a plug door in accordance with the present invention.

FIG. 4 is a perspective schematic view of the cables and linkages for guiding the plug door 16 between the door jamb 12 and the upper deck compartment 30. An upper shaft 46 and a lower support shaft 48 are rotatably mounted to and extend horizontally from the sides of the door 16. A bellcrank 50 with associated rollers 52 on a long arm 54 is provided at each end of the upper shaft 46 to engage the guide track 34 (not shown in FIG. 4). The rollers 52 are mounted on a roller support 56 that is pivotally mounted on the long arm 54 of the bellcrank 50. The continuous cable 42 is attached to the roller support 56, providing power for moving the door 16 between closure and storage. The cable 42 extends over pulleys 58, 60, 61 and 62, the latter of which is mounted within the upper deck compartment 30 and enables the system to guide the door 16 to storage therein. The cable 42 further extends over a power drum 64 that is actuated by the motor 38 to move the door 16.

The short arm 66 of the bellcrank 50 is connected to a lower bellcrank 68 by a push-pull rod 70. The lower bellcrank 68 is mounted on the lower support shaft 48 with the push-pull rod 70 attached to the short arm 72. As shown in FIG. 4, the bellcrank 68 has a pair of long arms 74 with roller support 76 pivotally mounted thereon. Each support 76 has roller 78 which engages the guide tracks 34.

Figure 6:
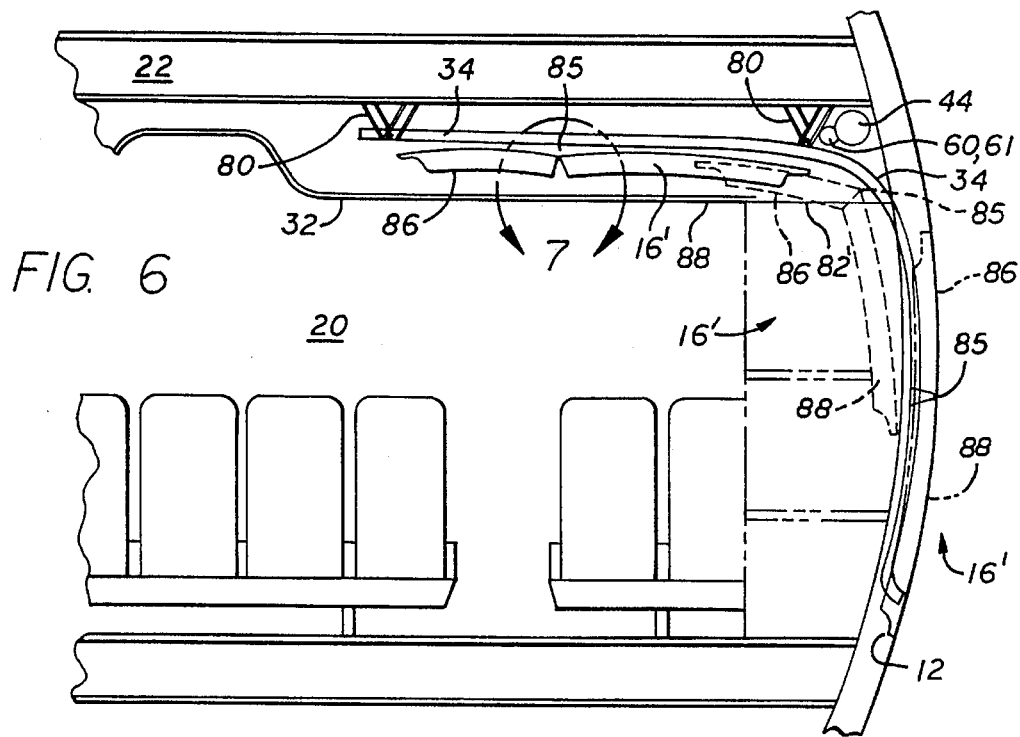
FIG. 6 is a cross-sectional view of the main cabin of a double-decked aircraft in the region of a door jamb with various elements removed for purposes of clarity and illustrating the positions assumed by a plug door in accordance with an alternative embodiment of the invention between closure and storage configurations.
Figure 7:
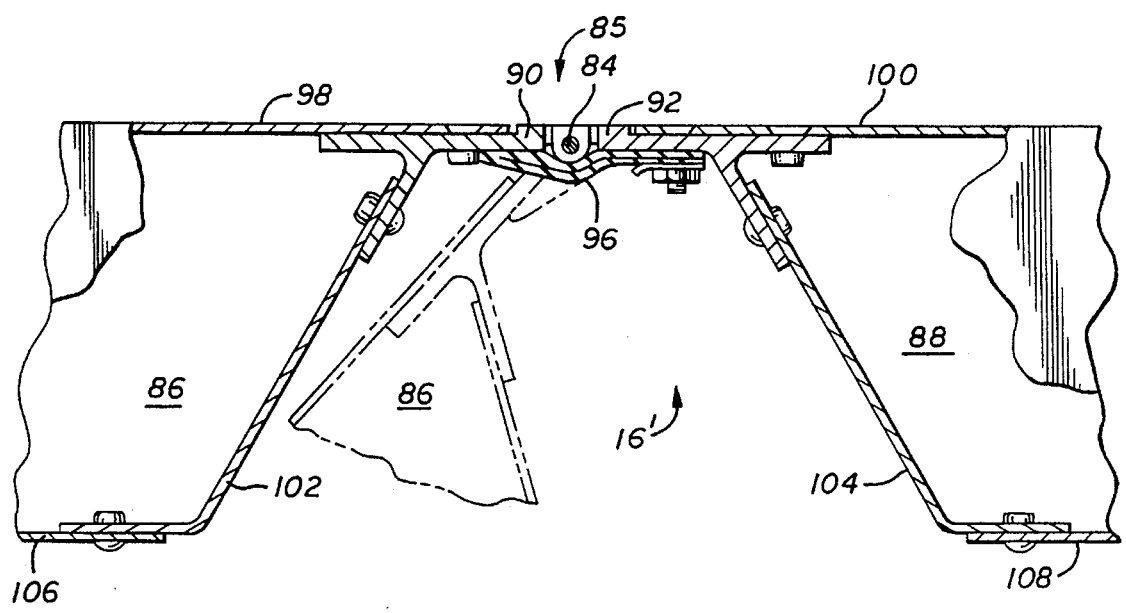
FIG. 7 is a sectional view of the central region of a two part hinged door in accordance with the invention taken at line 7—7 of FIG. 6.
Figure 8:
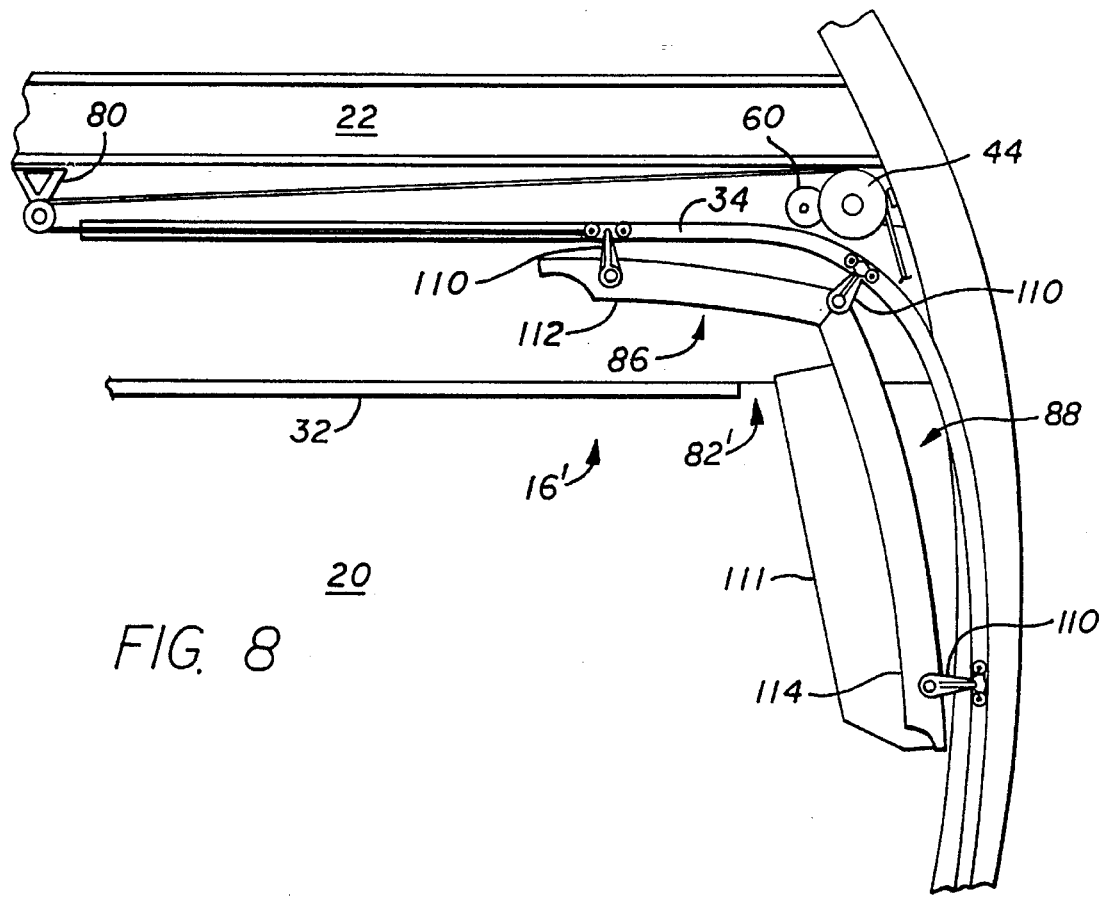
FIG. 8 is an enlarged view of a corner region of the main cabin of a double-decked aircraft for illustrating apparatus in accordance with the invention for interconnecting a hinged door to a guide track.

The details of particular various elements disclosed in FIG. 4 and their operation are described in detail in U.S. Pat. No. 3,585,757, referenced above. In particular, FIGS. 4 and 5 of that patent illustrate the operation of a linkage structure that utilizes elements and arrangements similar to those of FIG. 4 herein. Unlike the apparatus disclosed in FIG. 4 herein, however, the patented device is not adapted for use or suitable with double-decked aircraft. FIGS. 6 through 8 of the referenced patent provide details of the upper rollers, bellcrank and the upper end of the push-pull rod, the lower rollers and linkages while FIG. 9 of that patent discloses details of the cable actuating mechanism.

In operation, the motor 38 exerts an upward pull on the cable 42 that causes the bellcrank 50 to rotate clockwise until the upper shaft 46 is aligned with the direction of pull on the cable 42. This causes the top of the door 16 to move somewhat inwardly and places additional tension on the push-pull rod 70 that imparts a counterclockwise rotation on the short arm 72 of the lower bellcrank 68. The rollers 78 will react on the guide track 34 (not shown in FIG. 4) to cause the door 16 to move inwardly and away from the door jamb 12 so that it is free to rotate, traveling to its storage position within the upper deck compartment 30.

The continuing upward force of the cable 42 will cause further reaction of the roller 78 and will translate the tension of the push-pull rod 70 into compression as the rod 70 tends to move ahead of the upper bellcrank 50. This results in further rotation of the bellcrank 50 that acts to cam the upper portion of the door 16 inwardly as a prelude to rotation to the illustrated horizontal storage position. Such rotation, described below, results from the continuing pull of the cable 42.

The opposite action occurs when the door 16 is lowered to closure, filling the door jamb 12. In this mode, the motor 38 pulls the cable 42 downwardly in opposition to the action of the counterbalance spring 44. The door 16 rotates and moves downwardly with the aid of gravity. Any oscillation is prevented by the configuration of the lower bellcrank 68 in the four-bar linkage system on the door 16. As the lower bellcrank 68 approaches the lower end of the track 34, rotation of the bellcrank 68 is produced by the lower track curvature to cause the lower end of the door 16 to close into the door jamb 12. Such rotation applies tension on the push-pull rod 70 that, in turn, rotates the upper bellcrank 50 clockwise about the roller support 56. This moves the upper part of the door 16 into the door jamb 12.

Figure 5:
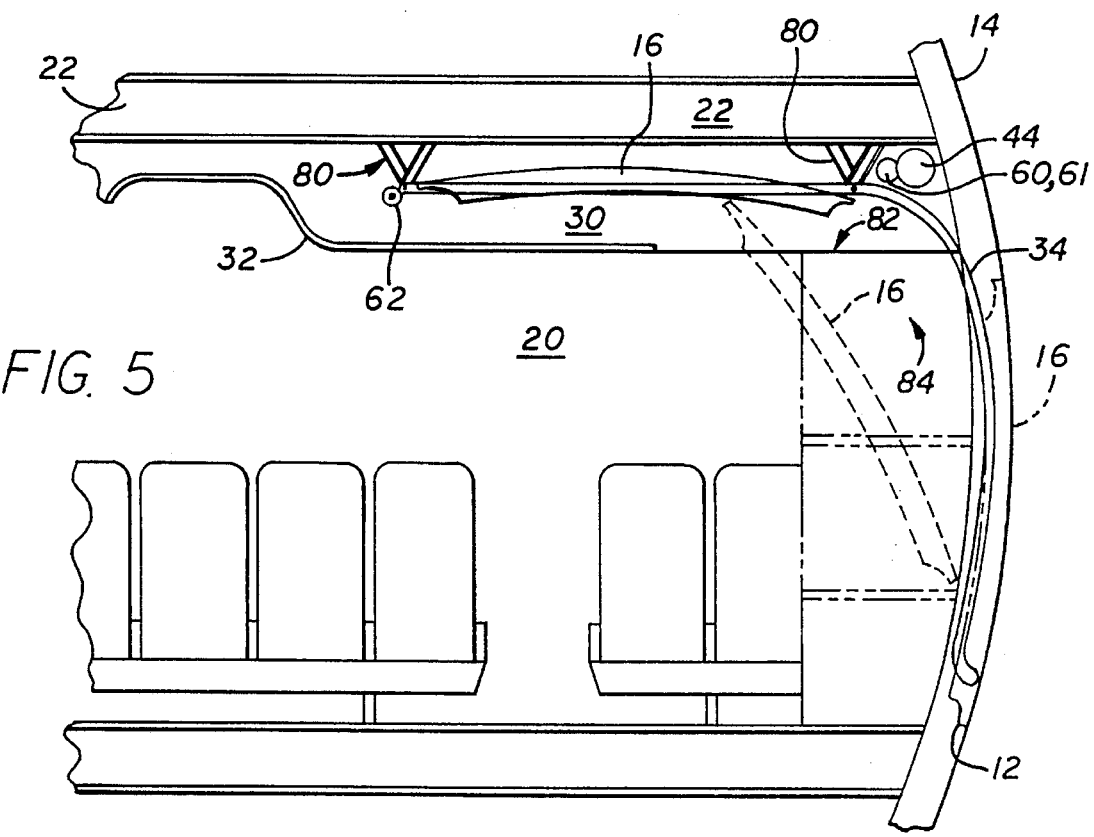
FIG. 5 is a cross-sectional view of the upper cabin of a double-decked aircraft in the region of a door jamb with various elements removed for purposes of clarity and illustrating the path of travel of a plug door between closure and storage in accordance with the invention.

FIG. 5 is a cross-sectional view of the main cabin 20 of a double-decked aircraft in the region of the door jamb 12 with various elements removed for purposes of clarity and illustrating the path of travel of the door 16 in accordance with the invention. As can be seen, when seated in the door jamb 12, the exterior surface of the door 16 is appropriately contoured to form a single continuum with the exterior skin of the fuselage 14. The linkages and elements discussed above, including the pulleys 60 and 62 as shown, combine with the guide tracks 34, each of which comprises a complex shape including a substantially horizontal upper region that is joined, via a curved intermediate portion, to a gently arcuate, substantially vertical lower region. The lower region of the guide track 34 is adjacent to the sides of the door jamb 12 while v-shaped brackets 80, having arms fixed to the upper floor 22, secure the upper region of the guide track 34 within the upper deck compartment 30.

An aperture 82 is provided at the edge of the header 32 to accommodate the door 16 (shown in shadow outline) as it travels between the storage and closure positions illustrated in FIG. 5. An arrow 84 indicates counterclockwise rotation of the door 16 which occurs when traveling from the closed to the storage position. Opposite, counterclockwise rotation occurs when the door is moved from storage to closure.

The mechanisms and linkages described above actuate the door 16 to move along the guide track 34 to travel as described and illustrated with reference to FIG. 5. Such elements similarly permit actuation of a door of alternate configuration. FIG. 6 is a cross-sectional view of the main cabin 20 of a double-decked aircraft in the region of the door jamb 12 with various elements removed for purposes of clarity and illustrating selected orientations assumed by a plug door 16' in accordance with an alternative embodiment of the invention. As shown in FIG. 6, the door 16' includes a central hinge 85 that divides it between a top section 86 and a bottom section 88. As may be noted, the hinging of the two-section door 16' permits it to follow the shape of the guide track 34 more closely than can a one piece plug door. As a consequence, use of the limited space of the main cabin 20 is further economized. A smaller aperture 82' is required at the edge of the header panel 32 to clear a path of travel than in the case of a one piece plug door. Additionally, such alternative embodiment facilitates the safe access of a stewardess, passenger or other crew member to the region adjacent the door jamb 12 while the door 16 is in travel. This advantage is particularly useful in commercial aircraft that routinely transport inattentive and distracted travelers.

FIG. 7 is a sectional view of the central region of the two-section, hinged plug door 16' of the invention taken at line 7—7 of FIG. 6. As can be seen, the piano hinge includes hinge arms 90 and 92 that are pivoted to one another at a pin 94. A molded seal 96 of silicone rubber is bolted to the inner-facing portion of the hinge 85 while the outer surfaces of the hinge arms 90 and 92 are riveted to edges of aluminum sheeting 98 and 100 that form the outer skin of the upper and bottom portions 86 and 88 of the door 16'. The hinge arms 90 and 92 are interiorly bolted to aluminum door pans 102, 104 that provide transition to the inner skins 106, 108 of the upper and lower portions 86 and 88 of the door 16' respectively.

FIG. 8 is an enlarged view of a corner region of the main cabin 20 of a double-decked aircraft for illustrating apparatus in accordance with the invention to interconnect the hinged plug door 16' to the guide track 34. The door 16' is illustrated in edge view at approximately mid-transit between closure and storage. As can be seen, rollers 110 for engaging the guide track 34 are pivotally secured adjacent the region of the hinge 85 and to the sides 112 and 114 of the upper and bottom panels 86 and 88, respectively. The rollers 110 are provided to assure that the door 16' will assume a contour somewhat parallel to that of the curved guide track 34 during transit. This is particularly significant when the door 16' passes through the mid-region of greatest track curvature. By effectively "hanging" the door 16' as shown, the stressing of various components associated with the linkages for controlling transit between the closed and storage positions, including the motor 38, are minimized. This is particularly significant in view of the fact that a typical plug door (including an evacuation slide 111) may weigh in the neighborhood of 300 pounds. Further, the rollers 110 minimize the possibility of the door 16' going off-track.

Figure 9:
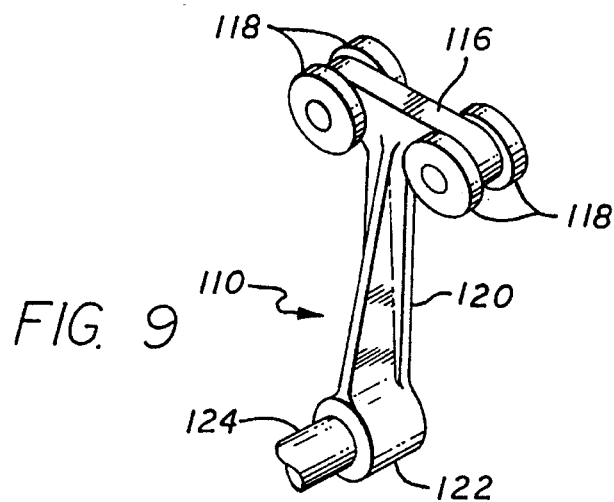
FIG. 9 is a perspective view of a roller for interconnection of a hinged door to a guide track in accordance with the invention.

FIG. 9 is a perspective view of a roller 110 for interconnecting the hinged door 16' to the guide track 34. The roller 110 is generally T-shaped. A transverse member 116 supports pivotally-mounted pairs of wheels 118 at its opposed ends. An arm 120 extends from the center of the transverse member 116, terminating with an enlarged circular portion 122 adapted to receive a shaft 124 that is fixed to a side of the door 16'.

Thus it is seen that the present invention provides an arrangement that is particularly suitable for providing ingress and egress to an aircraft of the double-decked type. By utilizing the invention in the disclosed embodiments, one obtains the benefits inherent in the use of a plug-type, inward-opening door in an aircraft configuration that is not otherwise readily adapted thereto.

While this invention has been described with reference to its presently preferred embodiments, it is not limited thereto. Rather, this invention is limited only insofar as it is defined by the following set of patent claims and includes within its scope all equivalents thereof.

What is claimed is:

1. In an aircraft of the type that includes an upper floor for defining an upper cabin and a main cabin, the improvement comprising, in combination:
    a) a plug-type door;
    b) a door jamb in a side of the fuselage of said aircraft adjacent said main cabin, said door jamb being adapted to receive said plug door;
    c) a header panel arranged beneath said upper floor and forming a storage compartment therewith;
    d) means associated with said fuselage for guiding said door between said door jamb and said compartment; and,
    e) means associated with said door for engaging said last-named means.

2. An aircraft as defined in claim 1 wherein said header panel includes an aperture in the region of the junction of said panel to the interior of said fuselage for accommodating passage of said door therethrough.

3. An aircraft as defined in claim 2 wherein said means for guiding includes a pair of guide tracks.

4. An aircraft as defined in claim 3 wherein:
    a) said pair of guide tracks comprises two parallel guide tracks; and
    b) each of said guide tracks is arranged to extend between a side of said door jamb and said storage compartment.

5. An aircraft as defined in claim 4 wherein each of said guide tracks further includes:
    a) a lower, substantially vertical portion substantially adjacent a side of said door jamb; and
    b) an upper, substantially horizontal portion within said storage compartment.

6. An aircraft as defined in claim 5 further characterized in that said guide track includes an intermediate curved portion between and continuous with said substantially horizontal upper portion and said substantially vertical lower portion.

7. An aircraft as defined in claim 5 wherein said means for guiding further comprises:
    a) a pair of cables;
    b) means engaged to said cables for selectively applying tension thereto;
    c) a pulley system for guiding said cables; and
    d) said system includes at least one pair of pulleys pivotally mounted within said storage compartment.

8. An aircraft as defined in claim 7 wherein said pulley system includes a pair of pulleys, each of said pulleys being pivotally mounted adjacent the end of an upper portion of one of said guide tracks.

9. An aircraft as defined in claim 8 wherein said plug door comprises a unitary structure.

10. An aircraft as defined in claim 8 wherein said plug door further includes:
    a) an upper section;
    b) a bottom section; and
    c) a hinge for joining said upper section to said bottom section.

11. An aircraft as defined in claim 10 further characterized in that:
    a) said hinge is located adjacent the exterior of said door; and,
    b) said hinge is a piano hinge.

12. An aircraft as defined in claim 11 further characterized in that:
    a) said means for engaging includes at least one roller, said at least one roller being pivotally mounted to a side edge of said door; and
    b) said at least one roller includes at least one wheel pivotally mounted adjacent the free end thereof for engaging said guide track.

13. An aircraft as defined in claim 12 wherein each of said rollers further includes:

a) a generally T-shaped body;

b) a pair of wheels pivotally mounted to opposed ends of the transverse member of said body; and c) the lower end of said T-shaped body is adapted to receive a shaft for engaging an edge of said plug door.

14. An aircraft as defined in claim 13 wherein said at least one roller is pivoted to the edge of said door adjacent said hinge.

15. An aircraft as defined in claim 14 further including a roller pivoted to the edge of said door adjacent the top and the bottom thereof.

* * * * *